(12) United States Patent
Linsky et al.

(10) Patent No.: US 11,275,648 B2
(45) Date of Patent: Mar. 15, 2022

(54) EMPTY DATA PACKET HARD ALIGN

(71) Applicant: QUALCOMM Incorporated, San Diego, CA (US)

(72) Inventors: Joel Linsky, San Diego, CA (US); Le Nguyen Luong, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 115 days.

(21) Appl. No.: 16/808,275

(22) Filed: Mar. 3, 2020

(65) Prior Publication Data
US 2021/0279126 A1 Sep. 9, 2021

(51) Int. Cl.
G06F 11/10 (2006.01)
H04L 1/18 (2006.01)
H04W 28/06 (2009.01)

(52) U.S. Cl.
CPC ........ *G06F 11/1004* (2013.01); *H04L 1/1812* (2013.01); *H04W 28/065* (2013.01)

(58) Field of Classification Search
CPC .. G06F 11/1004; H04L 1/1812; H04L 1/0061; H04W 28/065
See application file for complete search history.

(56) References Cited

U.S. PATENT DOCUMENTS

| | | | |
|---|---|---|---|
| 9,647,689 B2 | 5/2017 | Xhafa et al. | |
| 2010/0128725 A1* | 5/2010 | daCosta | H04L 1/1812 370/389 |
| 2010/0241838 A1* | 9/2010 | Cohen | G06F 11/1433 713/2 |
| 2017/0331586 A1* | 11/2017 | Liu | H04L 1/0061 |
| 2020/0412649 A1* | 12/2020 | Papadantonakis | H04L 45/74 |

OTHER PUBLICATIONS

International Search Report and Writtenn Opinion—PCT/US2021/020328—ISA/EPO—dated Jun. 8, 2021.

* cited by examiner

*Primary Examiner* — Thien Nguyen
(74) *Attorney, Agent, or Firm* — Arent Fox, LLP

(57) ABSTRACT

A wireless device is provided that determines a set of expected packets from a second wireless device, each expected packet of the set of expected packets comprising an expected cyclic redundancy check (CRC) of a set of expected CRCs, receives a packet from the second wireless device, the received packet comprising a header and a first CRC, determines whether a second CRC generated based on the header in the received packet matches the first CRC received in the received packet, determines, when the generated second CRC does not match the first CRC received in the received packet, a third CRC of the set of expected CRCs based on the first CRC, and replaces the received header with a header corresponding to the determined third CRC.

31 Claims, 13 Drawing Sheets

FIG. 6

| | LLID | NESN | SN | CIE | NPI | LENGTH | | | | | | | | | | CRC | | | | |
|---|---|---|---|---|---|---|---|---|---|---|---|---|---|---|---|---|---|---|---|---|
| 612 | 0 0 | 0 | 0 | 0 | 1 | 0 | 0 | 0 | 0 | 0 | 0 | 0 | 0 | 0 | 0 | 0 | 0 | 0 | ... | 1 |
| 614 | 0 0 | 0 | 0 | 1 | 1 | 0 | 0 | 0 | 0 | 0 | 0 | 0 | 0 | 0 | 0 | 0 | 1 | 1 | ... | 0 |
| 616 | 0 0 | 1 | 0 | 0 | 1 | 0 | 0 | 0 | 0 | 0 | 0 | 0 | 0 | 0 | 0 | 1 | 0 | 1 | ... | 0 |
| 618 | 0 0 | 1 | 0 | 1 | 1 | 0 | 0 | 0 | 0 | 0 | 0 | 0 | 0 | 0 | 0 | 0 | 0 | 0 | ... | 0 |

600

EMPTY DATA PACKET HARD ALIGN

TECHNICAL FIELD

The present disclosure relates generally to communication systems, and more particularly, to short-range wireless communication systems.

DESCRIPTION OF THE RELATED TECHNOLOGY

A wireless personal area network (WPAN) is a personal, short-range wireless network for interconnecting devices centered around a specific distance from a user. WPANs have gained popularity because of the flexibility and convenience in connectivity that WPANs provide. WPANs, such as those based on short-range wireless communications protocols, provide wireless connectivity to devices by providing wireless links that allow connectivity within a specific distance, such as 5 meters, 10 meter, 20 meters, 100 meters, etc.

Short-range wireless communications protocols may include the Bluetooth® (BT) protocol, the Bluetooth® Low Energy (BLE) protocol, the Zigbee® protocol, and so forth. BT is a wireless technology standard that enables radio frequency communication with ultra-high frequency (UHF) radio waves in the globally accepted Industrial, Scientific & Medical (ISM) band, such as from 2.400 gigahertz (GHz) to 2.485 GHz. Similarly, BLE defines a standard that enables radio frequency communication operating within the 2.4 GHz ISM band.

A short-range wireless communications protocol may be used to connect devices over a WPAN. Examples of devices that may communicate over a WPAN may include laptop computers, tablet computers, smart phones, personal data assistants, audio systems such as headsets, headphones, speakers, etc., wearable devices such as smart watches, fitness trackers, etc., battery-operated sensors and actuators in various medical, industrial, consumer, and fitness applications, and so forth.

In some scenarios, WPANs may offer advantages and conveniences over other network types, such as a wireless local area network (WLAN). However, short-range wireless communications in a WPAN may be susceptible to the same or similar issues as communication in other wireless networks. For example, short-range wireless communications may experience errors due to noisy and/or congested transmission mediums. Such issues experienced with short-range wireless communications may degrade the performance of devices, may degrade a user experience, and so forth.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various standards and protocols for use with a wireless personal area network (WPAN), such as the Bluetooth® (BT) and/or Bluetooth® Low Energy (BLE), may provide for decoding and/or decryption techniques, for example, in order to ensure packet integrity, recover from missed packets, and so forth. For example, at least a portion of a packet, such as the header and/or payload of the packet, may be protected with a cyclic redundancy check (CRC) value. A CRC value calculated by a receiving device based on the packet may be compared to the CRC value of the packet to verify that the packet was received without errors. If the CRC validation fails at the receiving device, then the packet may be invalid.

In an aspect of the disclosure, a method, a computer-readable medium, and an apparatus are provided. The apparatus may be a first wireless device. The first wireless device may determine a set of expected packets from a second wireless device, each expected packet of the set of expected packets comprising an expected cyclic redundancy check (CRC) of a set of expected CRCs; receive a packet from the second wireless device, the received packet comprising a header and a first CRC; determine whether a second CRC generated based on the header in the received packet matches the first CRC received in the received packet; determine, when the generated second CRC does not match the first CRC received in the received packet, a third CRC of the set of expected CRCs based on the first CRC; and replace the received header with a header corresponding to the determined third CRC.

In some aspects, the first wireless device may determine whether a difference between the third CRC and the first CRC is less than a threshold, wherein the received header is replaced with the header corresponding to the determined third CRC when the difference between the third CRC and the first CRC is less than the threshold.

In some aspects, the determining whether the difference between the third CRC and the first CRC is less than the threshold may include determining a number of bit differences between the third CRC and the first CRC; and determining whether the bit differences is less than or equal to the threshold.

In some aspects, the received packet may be received based on a data packet transmitted from the first wireless device to the second wireless device, and the first wireless device may retransmit the data packet to the second wireless device upon determining that the difference between the third CRC and the first CRC is greater than the threshold.

In some aspects, the first wireless device may determine whether a difference between an expected packet corresponding to the third CRC and the received packet is less than a threshold, wherein the received header is replaced with the header corresponding to the determined third CRC when the difference between the expected packet and the first CRC is less than the threshold.

In some aspects, the determining whether the difference between the expected packet and the received packet is less than the threshold may include determining a number of bit differences between components of the expected packet and components of the received packet, the components of the expected packet comprising the third CRC and a header of the expected packet, the components of the received packet comprising the first CRC and the received header of the received packet; and determining whether the bit differences is less than or equal to the threshold.

In some aspects, the first wireless device may determine that the received packet has a zero-length data payload, wherein the third CRC of the set of expected CRCs is determined based on the first CRC when the received packet is determined to have a zero-length data payload.

In some aspects, the first wireless device may establish an isochronous channel between the first wireless device and the second wireless device, wherein the third CRC of the set of expected CRCs is determined based on the first CRC when the isochronous channel is established.

In some aspects, the packet may be received based on a data packet transmitted from the first wireless device to the second wireless device, and the first wireless device may determine whether the replaced header corresponds to an acknowledgment (ACK) or negative ACK (HACK) associated with the data packet; and transmit a next data packet to the second wireless device upon determining that the replaced header corresponds to an ACK.

In some aspects, the first CRC may be a first header error correction value, the second CRC may be a second header error correction value, and the third CRC may be a third header error correction value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 is a diagram illustrating expected packet data.

DETAILED DESCRIPTION

Figure 1:
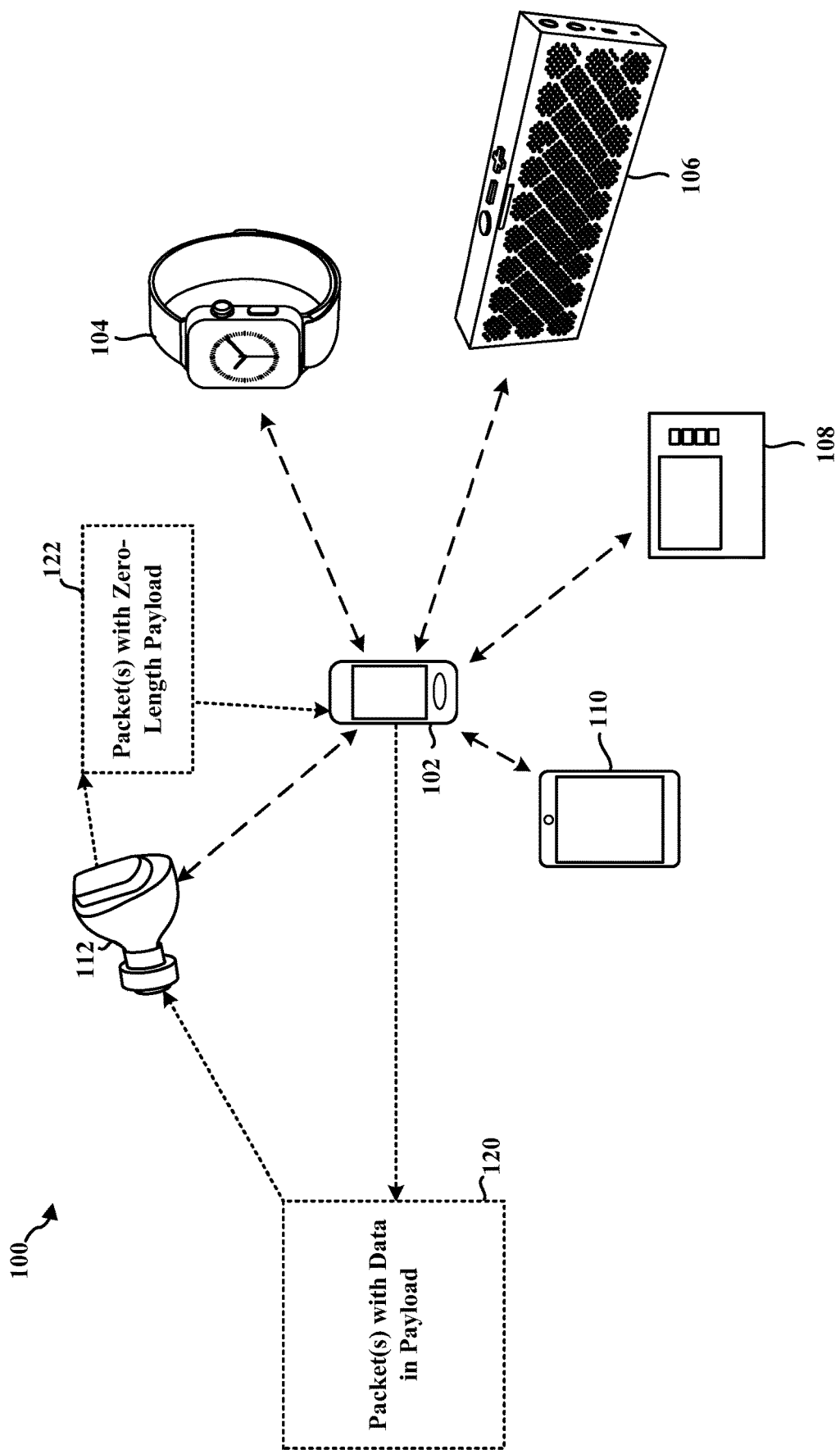
FIG. 1 is a diagram illustrating an example of a short-range wireless communications system, in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless devices and wireless communication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example WPAN 100 in accordance with certain aspects of the disclosure. Within the WPAN 100, a wireless source device 102 may use a communications link 116 to communicate with one or more peripheral devices 104, 106, 108, 110, 112 using a short-range wireless communications protocol. The short-range wireless communications protocol may include a Bluetooth® (BT) protocol or a BT Low Energy (BLE) protocol.

While the present disclosure may describe various aspects in the context of a WPAN implemented through BT and/or BLE, the present disclosure is not limited to a WPAN, BT, and/or BLE. Various aspects described herein may be applicable to a number of different technologies. For example, the concepts of the present disclosure may be applicable to any short-range radio/wireless technologies, such as Wi-Fi Direct, Infrared Wireless (IrDA), Ultra Wideband (UMB), induction wireless, ZigBee, and so forth. In addition, aspects of the present disclosure may be applied in a wireless local area network (WLAN), such as with WLAN voice over Internet Protocol (IP) (VoIP). In another example, aspects of the present disclosure may be applied in cellular networks, such as with a Long Term Evolution (LTE) radio access technology (RAT) and/or Fifth Generation (5G) New Radio (NR) RAT. The present disclosure may be applied to protocols where a limited number of pits change in an expected packet so that pre-calculation of expected packets is possible.

Examples of the source device 102 include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player, a camera, a game console, a tablet, a smart device, a wearable device, a vehicle, an electric meter, a gas pump, a toaster, a thermostat, a hearing aid, a wireless headset, (including wireless headphones), a medical sensor, a blood glucose on-body unit, an Internet-of-Things (IoT) device, or any other similarly functioning device.

Examples of the one or more peripheral devices 104, 106, 108, 110, 112 include a cellular phone, a smart phone, a SIP phone, a STA, a laptop, a PC, a desktop computer, a PDA, a satellite radio, a global positioning system, a multimedia device, a video device, a digital audio player, a camera, a game console, a tablet, a smart device, a wearable device, a vehicle, an electric meter, a gas pump, a toaster, a thermostat, a hearing aid, a wireless headset a wireless headset, (including wireless headphones), a medical sensor, a blood glucose on-body unit, an IoT device, or any other similarly functioning device. Although the source device 102 is illustrated in communication with six peripheral devices 104, 106, 108, 110, 112 in the WPAN 100, the source device 102 may communicate with more or fewer than six peripheral devices within the WPAN 100 without departing from the scope of the present disclosure.

A device, such as the source device 102, implementing the BT protocol may operate according to one radio mode, such as basic rate (BR)/enhanced data rate (EDR). Similarly, a device implementing the BLE protocol may operation according to a BLE radio mode. In some aspects, a device, such as the source device 102, may be configured with dual radio modes, and therefore may be able to operate according to the BR/EDR mode or the BLE mode, for example, based on the type of short-rage wireless communication in which the device may engage.

For example, the device may operate according to the BR/EDR mode for continuous streaming of data, for broadcast networks, for mesh networks, and/or for some other applications in which a relatively higher data rate may be more suitable. However, the device may operate according to the BLE mode for short burst data transmissions and/or for some other applications in which power conservation may be desirable and/or a relatively lower data rate may be acceptable. In other aspects, a device may operate according to one or more other radio modes, including proprietary radio mode, such as high speed radio modes, low energy radio modes, isochronous radio modes, etc.

A short-range wireless communications protocol, such as BT, BLE, and/or BR/EDR, may include and/or may use one or more other communications protocols, for example, for establishing and maintaining communications links. As illustrated, the source device 102 may establish a communications link 116 with at least one other device, such as a wireless headset 112, according to at least one communications protocol for short-range wireless communications.

The communications link 116 may include a communications link that adheres to a protocol included and/or for use with BT, BLE, BR/EDR, etc. In one aspect, the communications link 116 may include an asynchronous connectionless (ACL) link. With ACL, the source device 102 may connect (or "pair" in the terminology of the BT specification) with a second device, such as the headset 112. The connection is asynchronous in that the two devices may not need to synchronize, time-wise, data communications between each other to permit communication of data packets via the communications link 116.

In one aspect, the communications link 116 may include an Advanced Audio Distribution Profile (A2DP) link. An A2DP link provide for a point-to-point link between a source device, such as the source device 102, and a sink device, such as the headset 112. With an A2DP link, data packets including audio may be transmitted over an ACL data channel, and other information, for example, for controlling the audio stream, may be transmitted over a separate control channel. The data packets may occur non-periodically.

In another aspect, the communications link 116 may support synchronous logical transport mechanisms between a "master device" and a "slave device." For example, the communications link 116 may include a synchronous connection oriented (SCO) link.

In a further aspect, then, the communications link 116 may include an extended SCO (eSCO) link. An eSCO link may provide a symmetric or asymmetric point-to-point link between a master device and a slave device using time slots reserved for BT communications, and may also provide for a retransmission window following the reserved time slots. Because retransmissions may be facilitated using the retransmission window, an eSCO link may be suitable for audio streaming and/or voice use cases because a dropped audio or voice packet may be retransmitted, and therefore the probability of successfully receiving a data packet may be increased.

In one aspect, the communications link 116 may include an isochronous (ISO) link. With an ISO link, the communications link 116 may combine some features of both synchronous and asynchronous links. For example, a stream on an ISO link may begin with a start packet, and then data packets may be asynchronously transmitted. On an ISO link, the number of retransmission attempts by a transmitting device may be limited. Thus, if a receiving device is unable to decode a data packet within the limited number of retransmission attempts, then the data packet may be dropped and the receiving device may continue to receive the stream without data from the dropped data packet.

Due to various factors, wireless devices may cause congestion on the frequencies used for wireless channels, such as a wireless channel on which the communications link 116 is carried. Consequently, wireless communication channels, including the wireless communications channel on which the communications link 116 is carried, may be "noisy" in that static, congestion, and/or other interference may introduce random signals on the same frequency bands as those reserved to communicate over established the communications link 116. Such static, congestion, interference, and/or other random signals may cause errors to packets transmitted on the communications link 116 and/or may cause packets to be unreceived over the communications link 116.

In some standards and protocols, such as BLE and/or BR/EDR, the source device 102 may detect errors in a packet and/or a dropped/missed/unreceived packet through the use of cyclic redundancy check (CRC) validation. For example, failure of CRC validation may indicate one or more errors in a received packet.

CRC validation may be based on generating CRC values based on received packets and comparing the generated CRC to CRCs included in the received packets. Specifically, a receiving device that receives a packet may first generate a CRC value or a CRC checksum based on the received packet, such as based on a payload. The receiving device may compare the generated CRC value with a CRC value included in the received packet. If the generated CRC value matches the CRC value included in the received packet, then the received packet may be validated for CRC. However, if the generated CRC value does not match the CRC value included in the received packet, then the receiving device may determine that the received packet fails CRC validation. If the receiving device determines the received packet fails CRC validation, then the received packet may include errors and/or may be corrupted.

The communications link 116 between the source device 102 and the headset 112 may be an isochronous channel. The source device 102 may transmit a set of packets 120 over the communications link 116 to the headset 112. Each of the packets 120 may be a data packet. For example, each of the packets 120 may include a protocol data unit (PDU) having a payload. The headset 112 may transmit a set of packets 122 over the communications link 116. The set of packets 122 may include a limited number of packet options. For example, the packets of the set of packets 122 may have zero-length PDUs (e.g., may not contain data and/or may only indicate acknowledgement or negative acknowledgement) or may not have a payload at all (e.g., in the case of a BR/EDR NULL packet).

Figure 2:
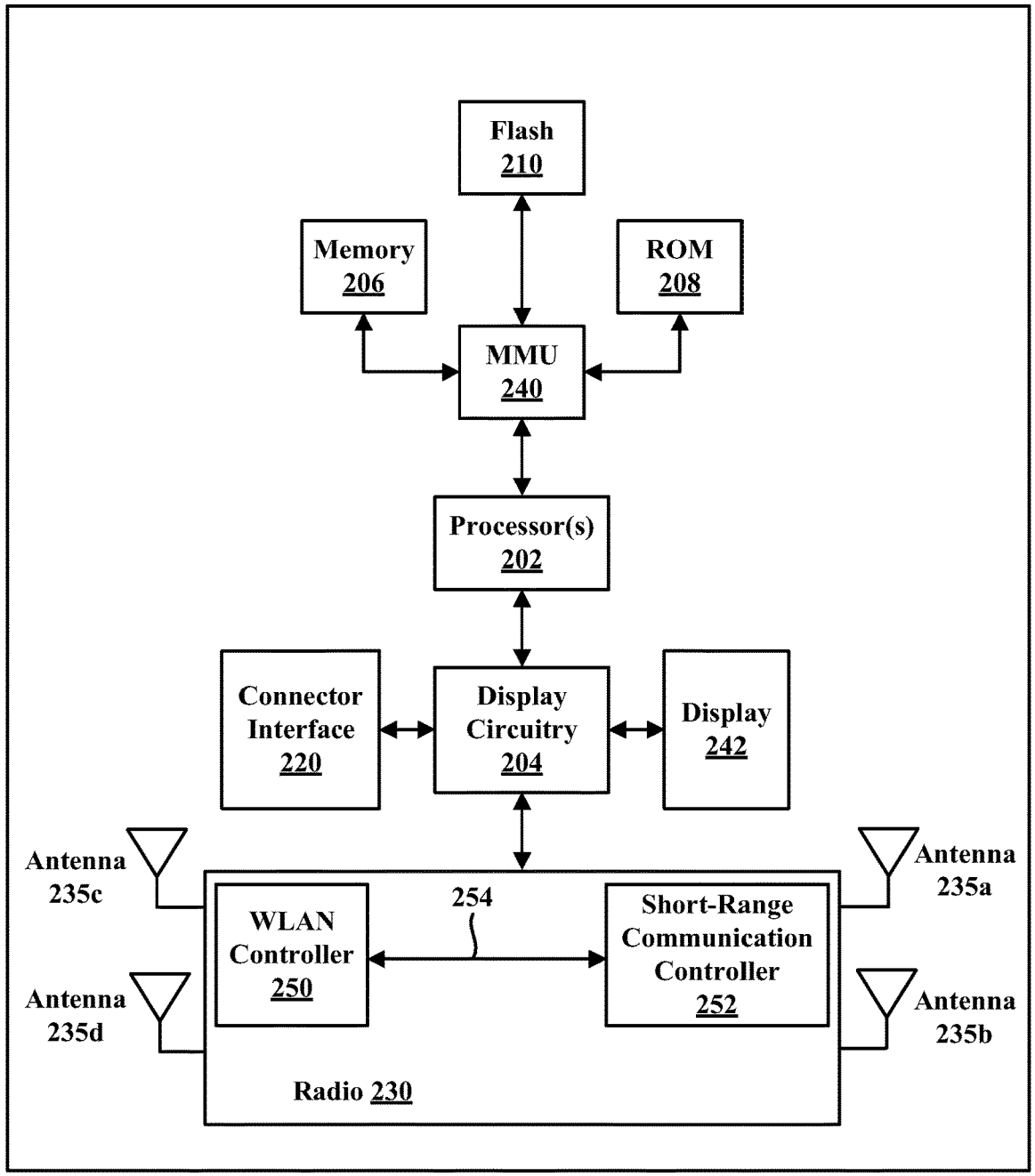
FIG. 2 is block diagram of a short-range wireless communications device, in accordance with certain aspects of the disclosure.

FIG. 2 is block diagram of a wireless device 200 in accordance with certain aspects of the disclosure. The wireless device 200 may correspond to, for example, the source device 102, and/or one of the peripheral devices 104, 106, 108, 110, 112 in FIG. 1. In certain configurations, the wireless device 200 may be, for example, a BT and/or BLE device that is configured to transmit isochronous data packets to another device over an isochronous channel, and to receive isochronous null packets from the other device in response.

As shown in FIG. 2, the wireless device 200 may include a processing element, such as a processor(s) 202, which may execute program instructions for the wireless device 200. The wireless device 200 may also include display circuitry 204, which may perform graphics processing and provide display signals to a display 242. The processor(s) 202 may also be coupled to a memory management unit (MMU) 240, which may be configured to receive addresses from the processor(s) 202 and translate those addresses to locations in memory, such as memory 206, ROM 208, Flash memory 210, and/or to other circuits or devices, such as the display circuitry 204, a radio 230, a connector interface 220, and/or the display 242. The MMU 240 may be configured to perform memory protection and page table translation or set up. In some aspects, the MMU 240 may be included as a portion of the processor(s) 202.

As shown, the processor 202 may be coupled to various other circuits of the wireless device 200. For example, the wireless device 200 may include various types of memory, the connector interface 220, which may allow for coupling to the computer system, the display 242, and/or wireless communications circuitry, which may facilitate Wi-Fi, BT, BLE, etc. The wireless device 200 may include a plurality of antennas 235a, 235b, 235c, 235d, for performing wireless communication with other short-range wireless communications devices, including BT devices, BLE devices, etc.

In certain aspects, the wireless device 200 may include hardware and software components (a processing element) configured to separately check the header of the data packet for errors and perform majority voting of a data packet, for example, using the techniques described herein. The wireless device 200 may also include firmware or other hardware/software for controlling short-range wireless communications operations, such as BT operations, BLE operations, etc. In addition, the wireless device 200 may store and execute a WLAN software driver for controlling WLAN operations.

The wireless device 200 may be configured to implement part or all of the error correction techniques described herein, for example, by executing program instructions stored on a memory medium, such as a non-transitory computer-readable memory medium, and/or through hardware or firmware operation. In other aspects, the error correction techniques described herein may be at least partially implemented by a programmable hardware element, such as an field programmable gate array (FPGA), and/or as an application specific integrated circuit (ASIC).

In certain aspects, the radio 230 may include separate controllers configured to control communications for various respective radio access technology (RAT) protocols. For example, as shown in FIG. 2, radio 230 may include a wireless local area network (WLAN) controller 250 configured to control WLAN communications and a short-range communications controller 252 configured to control short-range communications, such as BT communications, BLE communications, etc. A coexistence interface 254 may be used for sending information between the WLAN controller 250 and the short-range communications controller 252.

In some aspects, one or more of the WLAN controller 250 and/or the short-range communications controller 252 may be implemented as hardware, software, firmware or some combination thereof.

In certain aspects, the WLAN controller 250 may be configured to communicate with a second device using a WLAN link using all of the antennas 235a, 235b, 235c, 235d. In certain configurations, the short-range communications controller 252 may be configured to implement a short-range wireless communications protocol stack, such as a BT stack (FIG. 3A, infra) and/or a BLE stack (FIG. 3B, infra), and communicate with at least one second wireless device using one or more of the antennas 235a, 235b, 235c, 235d. The short-range communications controller 252 may be configured to reconstruct a PDU when the wireless device 200 is receiving or passively monitoring for packets sent by a source wireless device.

Figure 3A:
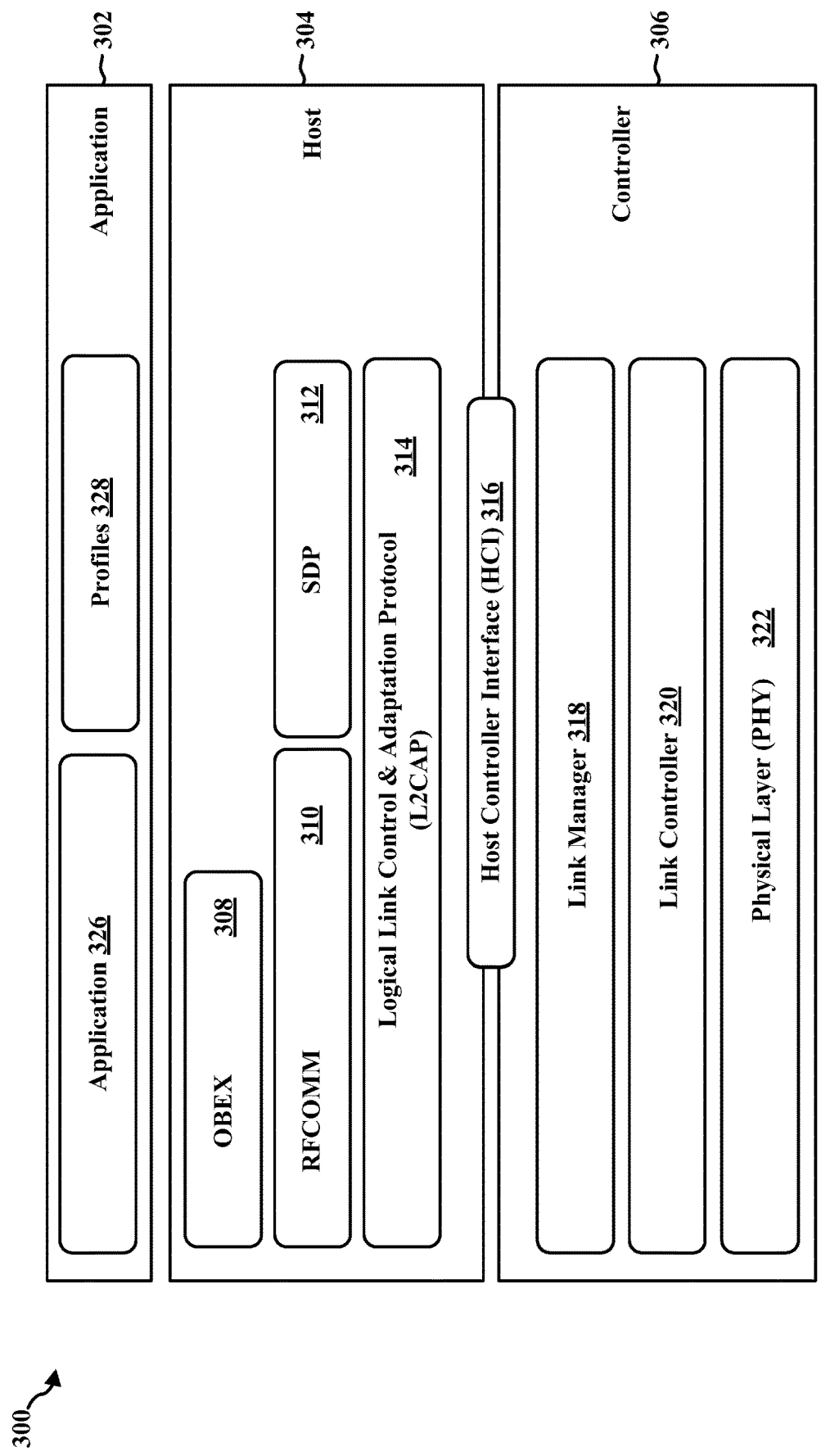
FIG. 3A is a diagram illustrating a Bluetooth (BT) protocol stack that may be implemented by a BT device, in accordance with certain aspects of the disclosure.

FIG. 3A illustrates a BT protocol stack 300 that may be implemented in a wireless device in accordance with certain aspects of the disclosure. For example, the BT protocol stack 300 may be implemented by one or more of processor(s) 202, memory 206, Flash memory 210, ROM 208, the radio 230, and/or the short-range communication controller 252 illustrated in FIG. 2.

Referring to FIG. 3A, the BT protocol stack 300 may be organized into lower layer(s), a middle layer(s), and upper layer(s). The lower layer(s) of the BT protocol stack 300 may include a controller stack 306, which may be used for, inter alia, hardware interface management, link establishment, and link management. The middle layer(s) of the BT protocol stack 300 may include a host stack 304, which may be used for, inter alia, application (layer) interface management to allow an application (layer) to access short-range wireless communications. The higher layer(s) of the BT protocol stack 300 may include an application layer 302, which may include one or more applications and one or more profiles that allow the one or more applications to use BT communications.

The controller stack 306 may include a physical (PHY) layer 322. The PHY layer 322 may include, for example, a radio and/or a baseband processor. In some aspects, the PHY layer 322 may define the mechanism for transmitting a bit stream over a physical link or channel that connects BT devices. The bit stream may be grouped into code words or symbols, and converted to a data packet that is transmitted over a wireless transmission medium. The PHY layer 322 may provide an electrical, mechanical, and/or procedural interface to the wireless transmission medium. The PHY layer 322 may be responsible for modulation and demodulation of data into radio frequency (RF) signals for transmission over the air. The PHY layer 322 may describe the physical characteristics of a wireless device's receiver/transmitter. The physical characteristics may include modulation characteristics, radio frequency tolerance, sensitivity level, etc.

The controller stack 306 may further include a link controller 320. The link controller 320 may be responsible for properly formatting data for providing to and obtaining from the PHY layer 322. Further, the link controller 320 may perform synchronization of links, including logical links including ACL links, A2DP links, SCO links, eSCO links, ISO links, etc. The link controller 320 may be responsible for executing commands and instructions issued by a link manager 318, including establishing and maintaining links instructed by the link manager 318.

The link manager 318 may translate host controller interface (HCI) 316 commands into controller-level operation, such as baseband-level operations. The link manager 318 may be responsible for establishing and configuring links and managing power-change requests, among other tasks. Each type of logical link, such as ACL links, A2DP links, SCO links, eSCO links, ISO links, etc., may be associated with a specific packet type. For example, an SCO link may provide reserved channel bandwidth for communication between a master device and a slave device, and support regular, periodic exchange of data packets with no retransmissions. An eSCO link may provide reserved channel bandwidth for communication between a master device and a slave device, and support regular, periodic exchange of data packets with retransmissions. An ACL link may exist between a master device and a slave device from the beginning of establishment of a connection between the master device and the slave device, and the data packets for ACL links may include encoding information in addition to a payload.

The link manager 318 may communicate with the host stack 304 through a host controller interface (HCI) 316—for example, the link manager 318 may translate HCI 316 commands into controller-level operations, such as baseband-level operations. The HCI 316 may act as a boundary between the lower layers, such as the controller stack 306, of the BT protocol stack 300 and the other layers of the BT protocol stack, such as the host stack 304 and/or the application layer 302. The BT specification may define a standard HCI to support BT systems that are implemented across two separate processors. For example, a BT system on a computer might use the BT system's own processor to implement the lower layers of the stack, such as the PHY layer 322, the link controller 320, and/or the link manager 318. The BT system might use a processor of a BT component to implement the other layers, such as the host stack 304 and the application layer 302. In some aspects, however, the BT system may be implemented on a same processor, and such a BT system may be referred to as "hostless."

The host stack 304 may include at least a Logical Link Control and Adaptation Protocol (L2CAP) layer 314, a service discovery protocol (SDP) layer 312, a radio frequency communication (RFCOMM) layer 310, and an object exchange (OBEX) layer 308. The L2CAP layer 314 is implemented above the HCI 316, and may communicate through the HCI 316. The L2CAP layer 314 may be primarily responsible for establishing connections across some existing links, such as logical links including ACL links, and/or requesting some links if those do not already exist. Further, the L2CAP layer 314 may implement multiplexing between different higher-layer protocols, such as SDP protocols and RFCOMM protocols, which may to allow different applications to use a single link, such as a logical link, including an ACL link. In addition, the L2CAP layer 314 may repackage data packets received from higher layers into a format expected by lower layers. The L2CAP layer 314 may employ the concept of channels to keep track of where data packets come from and where data packets should go. A channel may be a logical representation of the data flow or stream between the L2CAP layer 314 at a transmitting device (such as a master device) and another L2CAP layer 314 at a receiving device (such as a slave device.

The SDP layer 312 may define actions for both servers and clients of BT services.

The BT specification defines a service as any feature that may be usable by another (remote) BT device. An SDP client may communicate with an SDP server using a reserved channel on an L2CAP link to discover what services are available. When the SDP client finds the desired service, the SDP client may request a separate connection to use the service. The reserved channel may be dedicated to SDP communication so that a device knows how to connect to the SDP service on any other device. An SDP server may maintain an SDP database, which may include a set of service records that describe the services the SDP server offers. Along with information describing how an SDP client can connect to the service, the service records may contain a universally unique identifier (UUID) of the service.

The RFCOMM layer 310 may emulate the serial cable line settings and status of an RS-232 serial port. The RFCOMM layer 310 may connect to the lower layers of the BT protocol stack 300 through the L2CAP layer 314. By providing serial-port emulation, the RFCOMM layer 310 may support legacy serial-port applications. The RFCOMM layer 310 may also support the Object Exchange (OBEX) layer 308.

The OBEX layer 308 may define a communication protocol that may be used by devices to exchange data objects, and the data objects may also be defined by the OBEX layer 308. A BT device that wants to set up an OBEX communication session with another device may be considered the client device. The client initially may send one or more SDP requests to ensure that the other device can act as a server of OBEX services. If the server device can provide OBEX services, the server device may respond with the OBEX service record of the server device. The OBEX service record may contain an RFCOMM channel number that the client device may use to establish an RFCOMM channel. Further communication between the two devices may be conveyed in packets, which may contain requests, responses, and/or data. The format of the packet may be defined by the OBEX session protocol.

The application layer 302 may include at least one application 326, with which a user may interact and which may access BT communications for various functionality. The application 326 may access BT communications through one or more profiles 328, which may describe a variety of different types of tasks. By following procedures of one or more profiles 328, the application 326 may use BT communications according to a BT specification.

Figure 3B:
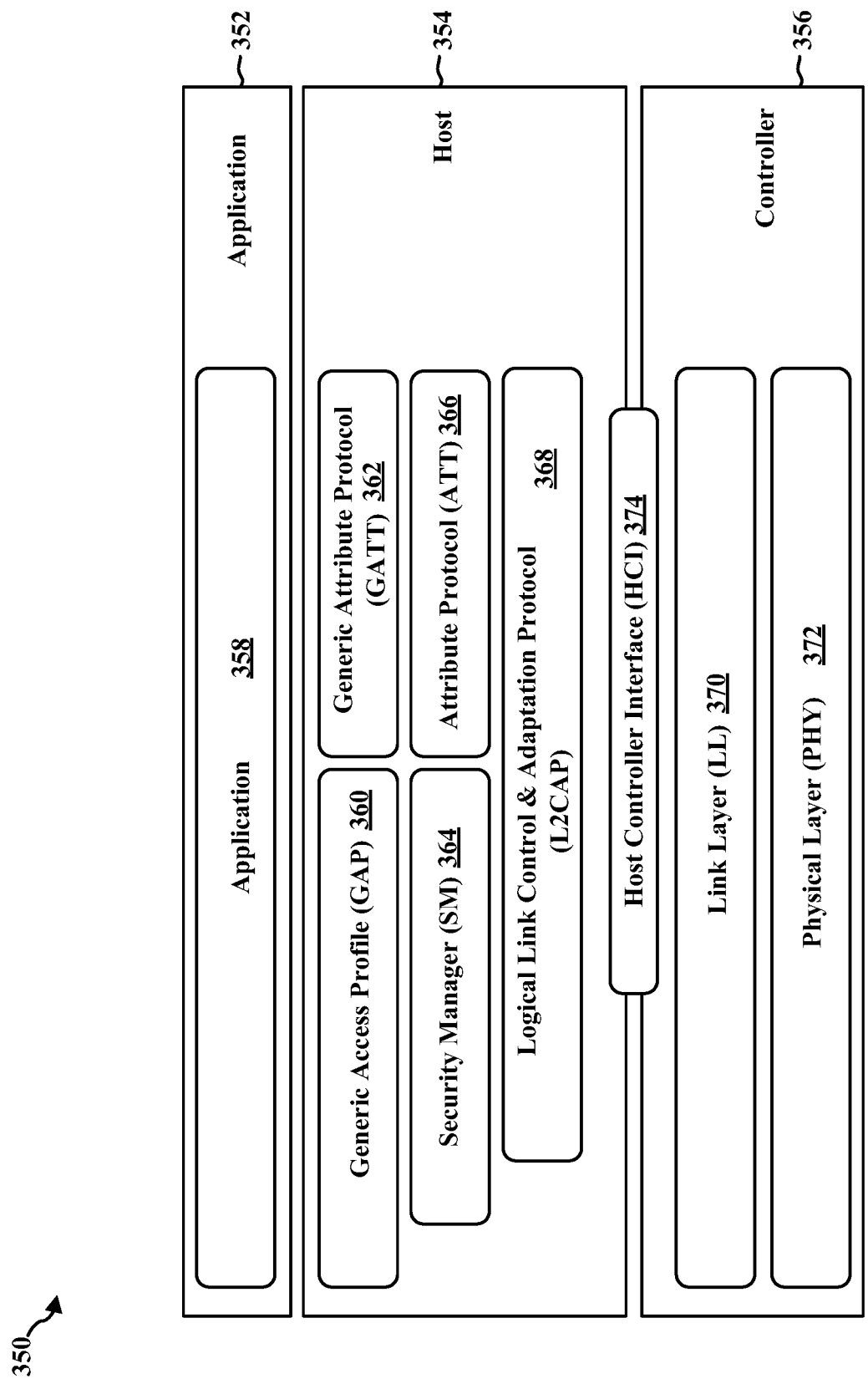
FIG. 3B is a diagram illustrating a BT Low Energy (BLE) protocol stack that may be implemented by a BLE device, in accordance with certain aspects of the disclosure.

FIG. 3B illustrates a BLE protocol stack 350 that may be implemented in a BLE device. For example, the BLE protocol stack 350 may be implemented by one or more of processor(s) 202, memory 206, Flash memory 210, ROM 208, the radio 230, and/or the short-range communications controller 252 illustrated in FIG. 2.

The BLE protocol stack 350 may be organized into three layers, which may include, an application layer 352, a host stack 354, and a controller stack 356. The controller stack 356 may be below the host stack 354 and the application layer 352 in the BLE protocol stack 350. The controller stack 356 may include a PHY layer 372 and a LL 370.

The PHY layer 372 may define the mechanism for transmitting a bit stream over a physical link that connects BLE devices. The bit stream may be grouped into code words or symbols, and converted to a data packet that is transmitted over a transmission medium. The PHY layer 372 may provide an electrical, mechanical, and procedural interface to the transmission medium. The shapes and properties of the electrical connectors, the frequency band used for transmission, the modulation scheme, and similar low-level parameters may be specified by the PHY layer 372.

The LL 370 is responsible for low-level communication over the PHY layer 372. The LL 370 manages the sequence and timing for transmitting and receiving data packets, and using a LL protocol, communicates with other devices regarding connection parameters and data flow control. The LL 370 also provides gatekeeping functionality to limit exposure and data exchange with other devices. If filtering is configured, the LL 370 maintains a list of allowed devices and will ignore all requests for data exchange from devices not on the list. The LL 370 may also reduce power consumption. In some aspects, the LL 370 may include a company's proprietary LL that may be used to discover peer devices, and establish a secure communication channel therewith. In certain aspects, the LL 370 may be responsible for transporting data packets between devices in a WPAN. Each data packet may include an access address, which specifies the type of logical transport used to carry the data packet. Logical transports may exist between a master device and slave devices. Additionally, some logical transports may carry multiple logical links.

The BLE protocol stack 350 may include an HCI 374, which may act as a boundary between the lower layers (such as the controller stack 356) of the BLE protocol stack 350 and the other layers of the BLE protocol stack (such as the host stack 354 and the application layer 352). In addition, the host stack 354 may communicate with a BLE controller (such as the short-range communications controller 252 in FIG. 2) in a wireless device using the HCI 374. The LL 370 may use the HCI 374 to communicate with the host stack 354 of the BLE protocol stack 350. While some BLE systems may be "hostless," in that the host stack 354 and the controller stack 356 may be implemented on a same processor, the HCI 374 may also allow the host stack 354 to communicate with different controller stacks 356, such as when the controller stack 356 is implemented on a second processor.

The host stack 354 may include a generic access profile (GAP) 360, a generic attribute protocol (GATT) 362, a security manager (SM) 364, an attribute protocol (ATT) 366, and an L2CAP layer 368. The L2CAP layer 368 may encapsulate multiple protocols from the upper layers into a data packet format (and vice versa). The L2CAP layer 368 may also break packets with a large data payload from the upper layers into multiple packets with the data payload segmented into smaller size data payloads that fit into a maximum payload size (for example, twenty-seven bytes) on the transmit side. Similarly, the L2CAP layer 368 may receive multiple data packets carrying a data payload that has been segmented, and the L2CAP layer 368 may combine the segmented data payload into a single data packet carrying the data payload that will be sent to the upper layers (such as the application layer 352).

The ATT 366 includes a client/server protocol based on attributes associated with a BLE device configured for a particular purpose (examples may include monitoring heart rate, temperature, broadcasting advertisements, etc.). The attributes may be discovered, read, and written by peer devices. The set of operations which are executed over ATT 366 may include, but are not limited to, error handling, server configuration, find information, read operations, write operations, queued writes, etc. The ATT 366 may form the basis of data exchange between BLE devices.

The SM 364 may be responsible for device pairing and key distribution. A security manager protocol implemented by the SM 364 may define how communications with the SM of a counterpart BLE device are performed. The SM 364 provides additional cryptographic functions that may be used by other components of the BLE protocol stack 350. The architecture of the SM 364 used in BLE is designed to minimize recourse requirements for peripheral devices by shifting work to an assumingly more powerful central device. BLE uses a pairing mechanism for key distribution. The SM 364 provides a mechanism to not only encrypt the data but also to provide data authentication.

Above the host stack 354 in the BLE protocol stack 350, the application layer 352 may include an application 358, such as a user application which interfaces with the host stack 354 of the BLE protocol stack 350 for various functionality through BLE communications.

Referring back to the host stack 354, the GATT 362 may provide a service framework using the attribute protocol for discovering services, and for reading and writing characteristic values on a peer device. The GATT 362 may interface with the application 358, for example, through a profile, which may define a collection of attributes and any permission needed for the attributes to be used in BLE communications. The GAP 360 may provide an interface for the application 358 to initiate, establish, and manage connections with other BLE devices.

In some aspects, a wireless device, such as the source device 102, the wireless device 200, etc., may be configured to communicate according to different standards and/or protocols. For example, the wireless device may be configured with both BT and BLE for short-range wireless communications. Accordingly, the wireless device may be configured with both the BT protocol stack 300 and the BLE protocol stack 350. In some aspects, one or more layers may be configured for use in both the BT protocol stack 300 and the BLE protocol stack 350—for example, the L2CAP layers 314, 368 of the protocol stacks 300, 350 may be configured for dual mode short-range wireless communications using either BT or BLE.

Figure 4A:
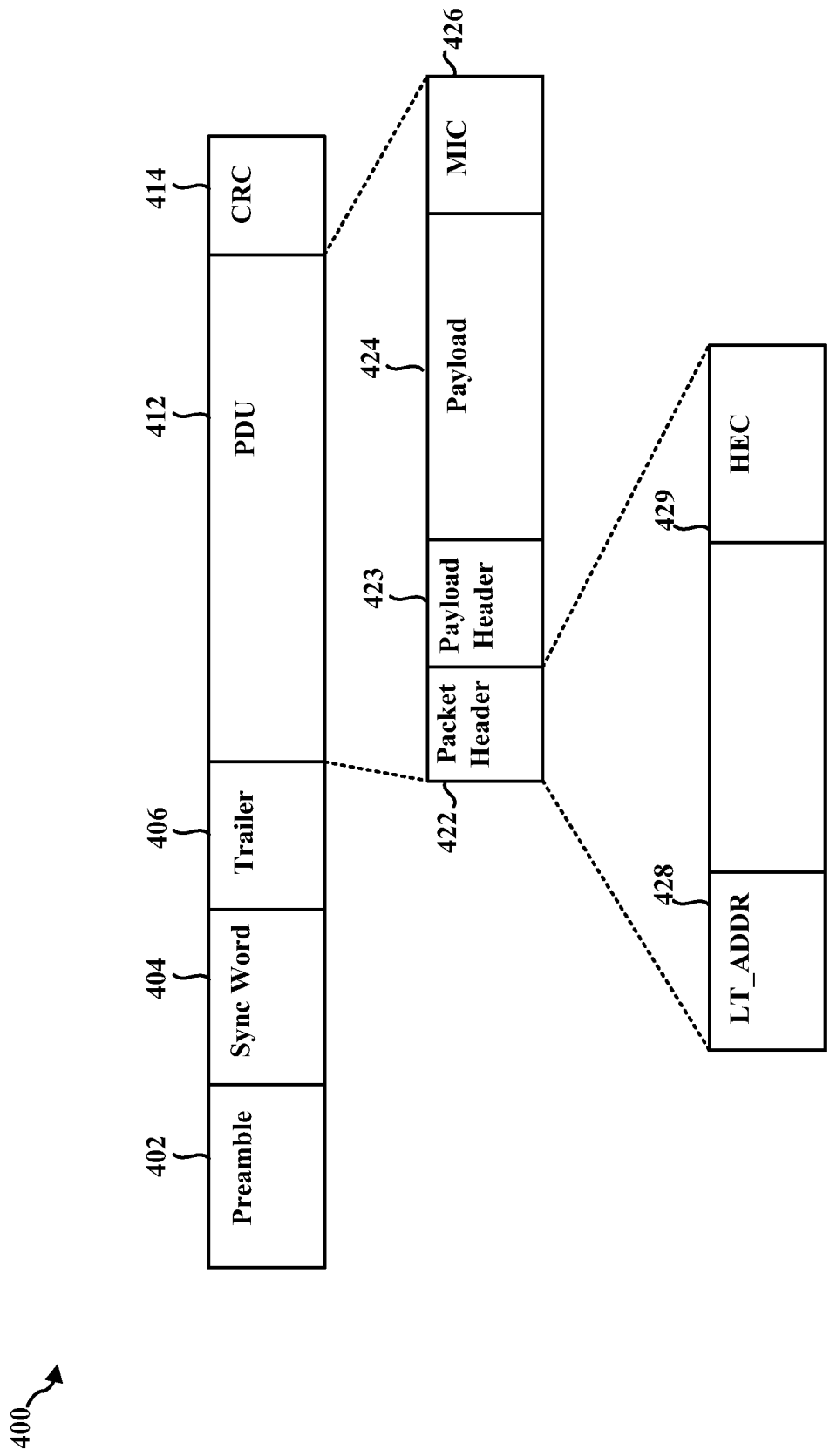
FIG. 4A is a diagram illustrating a BT data packet, in accordance with certain aspects of the disclosure.

FIG. 4A is a diagram illustrating a data packet 400 in accordance with certain aspects of the present disclosure. The data packet may be used with various short range wireless communications technologies, such as BT and including BR/EDR. The data packet 400 may include a preamble 402, a sync word 404, a trailer 406, a PDU 412, and a CRC 414.

In certain configurations, the PDU 412 may include a packet header 422, a payload header 423, a payload 424, and a message integrity code (MIC) 426. The MIC includes information that may be used to authenticate a data packet, for example, when the data packet is encrypted. In other words, the MIC may be used by the receiving device to confirm and/or authenticate that the message came from the stated transmitting device, and to confirm that the payload 424 has not been changed (which may provide data packet integrity). The MIC 426 protects both payload integrity and the authenticity of the data packet 400 by enabling a receiving device who also possess the secret key to detect any changes to the payload 424. In some aspects, the MIC 426 may be present when the packet 400 is encrypted, such as encrypted using AES-CCM encryption, but may be absent when the packet 400 is unencrypted.

In certain configurations, such as BR/EDR, the payload 424 (excluding the MIC 426, packet header 422, and payload header 423) may include an unencrypted baseband packet. For example, the payload 424 may include a payload portion (excluding a MIC and payload header) of an unencrypted baseband ACL-user data (ACL-U) packet.

In some aspects, the packet header 422 of the PDU 412 may include a plurality of fields, including an LT ADDR 428. The LT ADDR may indicate a logical transport address. The LT ADDR 428 may be associated with a logical link, and may separate logical transports in a piconet. For example, a logical transport address included in the LT ADDR 428 may indicate a type of logical link. In some aspects, the packet header 422 of the PDU may include a header error correction (HEC) 429. The HEC 429 may be a CRC value used to validate the header through CRC validation. The HEC 429 may be eight bits.

In certain configurations, the packet header 422 of the PDU 412 may include a logical link identifier (LLID). The LLID may be a two-bit field of the packet header 422.

The payload header 423 may include information for routing the packet.

Figure 4B:
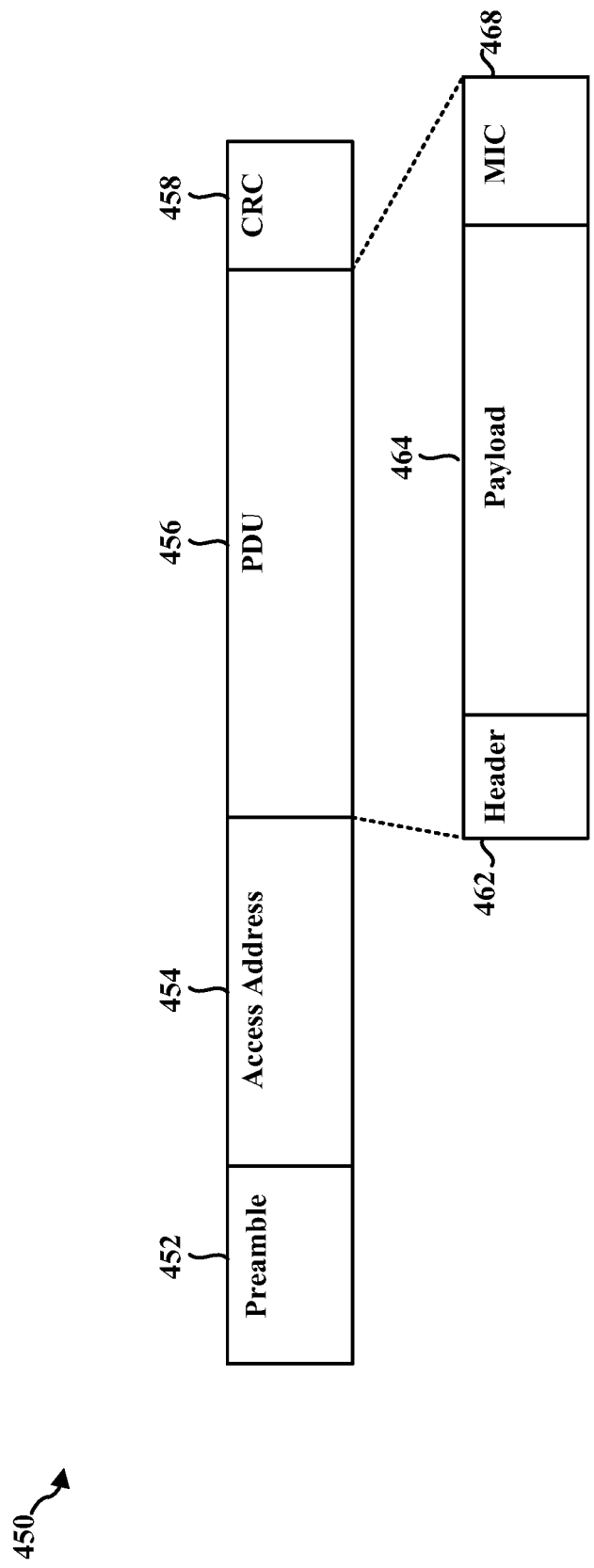
FIG. 4B is a diagram illustrating a BLE data packet, in accordance with certain aspects of the disclosure.

FIG. 4B is a diagram illustrating a data packet 450 in accordance with certain aspects of the present disclosure. The data packet may be used with various short range wireless communications technologies, such as BLE. The data packet 450 may include a preamble 452, an access address 454, a PDU 456, and a CRC 458. In certain configurations, the data packet 450 may not include the CRC 458.

In some aspects, the access address 454 may set the address of a link layer (such as the link layer 370) connection. For example, the access address 454 may include an address that indicates a type of logical link, including ACL, ISO, etc.

In certain configurations, the PDU 456 may include a header 462, a payload 464, and a MIC 468. The MIC includes information that may be used by to authenticate a data packet, for example, when the data packet is encrypted.

In some aspects, the header 462 of the PDU 456 may include a plurality of fields, including at least an LLID, which may be a two-bit field.

In certain configurations, the payload 464 (excluding the MIC 468 and header 462) may include an unencrypted baseband packet. For example, the payload 464 may include a payload portion (excluding a MIC and payload header) of an unencrypted baseband ACL-U packet.

Figure 5:
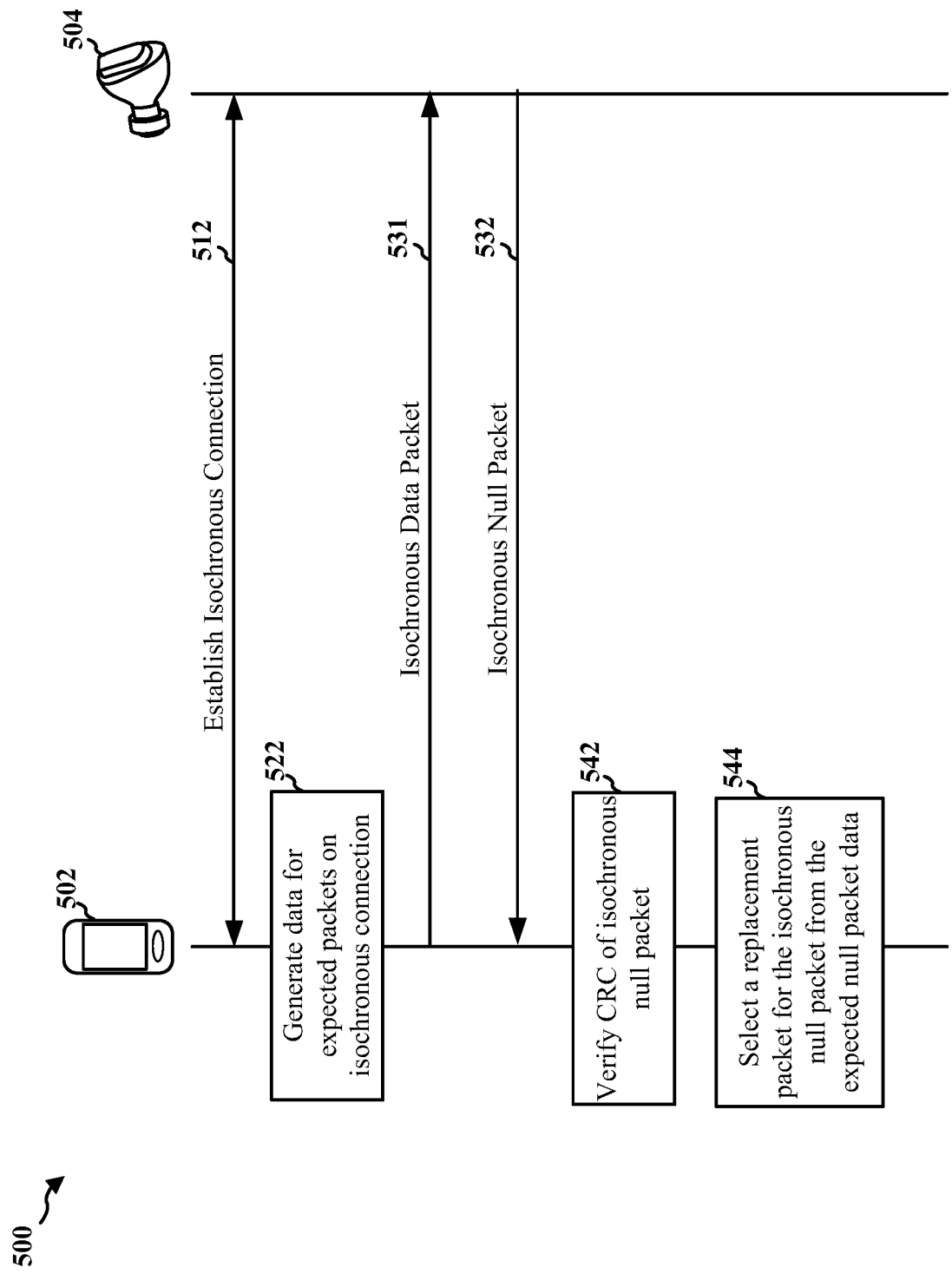
FIG. 5 is a communication flow diagram illustrating communication between wireless devices with empty packet alignment.

FIG. 5 is a communication flow diagram 500 illustrating communication between wireless devices with empty packet alignment.

A first wireless device 502 and a second wireless device 504 establish an isochronous connection 512 between the first wireless device 502 and the second wireless device 504. The first wireless device 502 may be a source of streaming data such as audio, and the second wireless device may be a playback device for the streaming data such as a headset or earpiece. The isochronous connection 512 may be for the first wireless device to send packets with data to the second wireless device (e.g., a packet with a connected isochronous stream (CIS) data PDU). The second wireless device 504 may respond to the packets containing the data by transmitting an acknowledgement (ACK) or a negative acknowledgement (NACK) packet with no data in the packet payload (e.g., a packet with a CIS null PDU).

As illustrated at 522, the first wireless device 502 may generate data for expected packets which will be expected to be included in the packets received from the second wireless device 504 on the isochronous connection 512. For example, FIG. 6 is a diagram illustrating expected packet data 600, including data for a first expected packet 612, a second expected packet 614, a third expected packet 616, and a fourth expected packet 618. The second wireless device 504 may be expected to send a limited number of different packets as part of the isochronous connection, or may be expected to send a particular packet a number of times. For example, the second wireless device 504 may send packets in which many or most of the values of the fields of the header are the same and which do not include data in the payload. In some aspects, the second wireless device 504 may respond to an isochronous data packet from the first wireless device 502 by sending a isochronous null packet to the first wireless device 502, and each isochronous null packet may have a PDU header with the same logical link identifier (LLID), sequence number (SN), null PDU indicator (NPI), and Length fields; a limited number of fields, such as the next expected sequence number (NESN) and the close isochronous event (CIE) fields may change. The first wireless device 502 may determine the different packets that could result from combinations of the changing fields and generate the a table of these expected packets. The first wireless device 502 may then determine the CRC values that would correspond to each of the expected packets. For example, the first wireless device 502 may utilize the CRC Init value to calculate the CRC for every expected value of the packet header of the expected packets. The CRC Init value may be a value that is preloaded into a Linear Feedback Shift Register (LFSR) that performs the CRC. This initialization may separate identical payloads from different devices. Finally, the first wireless device 502 may store the expected packet data including the expected packet headers and the corresponding CRC values in an array.

For example, as illustrated in FIG. 6, the second wireless device 504 may be expected to send isochronous null packets on the isochronous channel which include a "00" value for the LLID field (indicating that the PDU is an unframed CIS Data PDU, an end fragment of a service data unit (SDU), or a complete SDU), a "0" value for the SN field (indicating that the SN field is RFU), a "1" value for the NPI field (indicating that the PDU is a null PDU), and a "00000000" value for the Length field (indicating that the PDU is a zero-length data payload PDU). The NESN field will toggle between having a value of "0" and having a value of "1." The CIE field will have a value of "0" until the isochronous connection is to be closed, at which time the CIE field will have a value of "1." The first wireless device 502 may generate (or be configured/preconfigured with) expected data packets having the same LLID, SN, NPI, and Length fields. The first expected data packet 612 may include a "0" value for the NESN field and a "0" field for the CIE field. The second expected data packet 614 may include a "0" value for the NESN field and a "1" field for the CIE field. The third expected data packet 616 may include a "1" value for the NESN field and a "0" field for the CIE field. The fourth expected data packet 618 may include a "1" value for the NESN field and a "1" field for the CIE field. The first wireless device 502 may store the expected packets in a table or an array. The first wireless device 502 may generate (or may be configured/preconfigured with) a CRC for each expected packet and store the CRC with the expected packet. The CRC for each expected packet may be 24 bits; however, for ease of illustration and explanation, only four bits are depicted in each CRC in FIG. 6.

At 531, the first wireless device 502 sends a isochronous data packet 531 to the second wireless device 504. For example, the isochronous data packet 531 may include a PDU including audio data to be played by the second wireless device 504. The second wireless device 504 may receive the isochronous data packet 531 and may transmit an isochronous null packet 532 to the first wireless device 502 in response to the isochronous data packet 531. The first wireless device 502 may receive the isochronous null packet 532. The isochronous null packet 532 may or may not be received with errors (e.g., incorrect bit values).

At 542, the first wireless device 502 may verify the CRC of the isochronous null packet 532. The first wireless device 502 may generate a CRC corresponding to the values of the isochronous null packet 532 (e.g., the values of the fields of the PDU of the isochronous null packet 532). The first wireless device 502 may then compare the generated CRC to the CRC received with the isochronous null packet 532. If both CRCs are the same, the first wireless device may determine that the isochronous null packet 532 was received without errors and may process the packet as received. If the CRCs are different, the first wireless device 502 may determine that the isochronous null packet 532 was received with an error (e.g., one or more incorrect value in the PDU).

At 544, the first wireless device 502 may select a replacement packet for the isochronous null packet 532. The first wireless device 502 may compare the received packet to the expected packets and select one of the expected packets as suitable to replace the isochronous null packet 532 as received.

In some aspects, the first wireless device 502 first determines whether the received isochronous null packet 532 includes a PDU with a zero-length data payload. The expected packets may correspond to isochronous null packets with limited variability in values, and by verifying that the isochronous null packet 532 includes a zero-length data payload, the first wireless device 502 may identify that the packet was supposed to be an isochronous null packet likely to be one of the expected packets. In some aspects, the wireless device 502 may check the NPI field to verify that it identifies the isochronous null packet 532 as a null PDU packet. In some aspects, the wireless device 502 may check the Length field to verify that it identifies the payload as having a length of zero. In some aspects, the wireless device 502 may measure the number of bits, if any, in the payload to verify that the length is zero. In some aspects, the first wireless device 502 may perform a combination of the above or all of the above methods of determining whether the received isochronous null packet 532 includes a PDU with a zero-length payload. If the received isochronous null packet 532 includes a PDU with a zero-length payload, the first wireless device 502 may continue selecting a replacement for the isochronous null packet 532. If the received isochronous null packet 532 does not include a PDU with a zero-length payload, the first wireless device 502 may fail the CRC verification of the received isochronous null packet 532 and may not determine a replacement.

Figure 7:
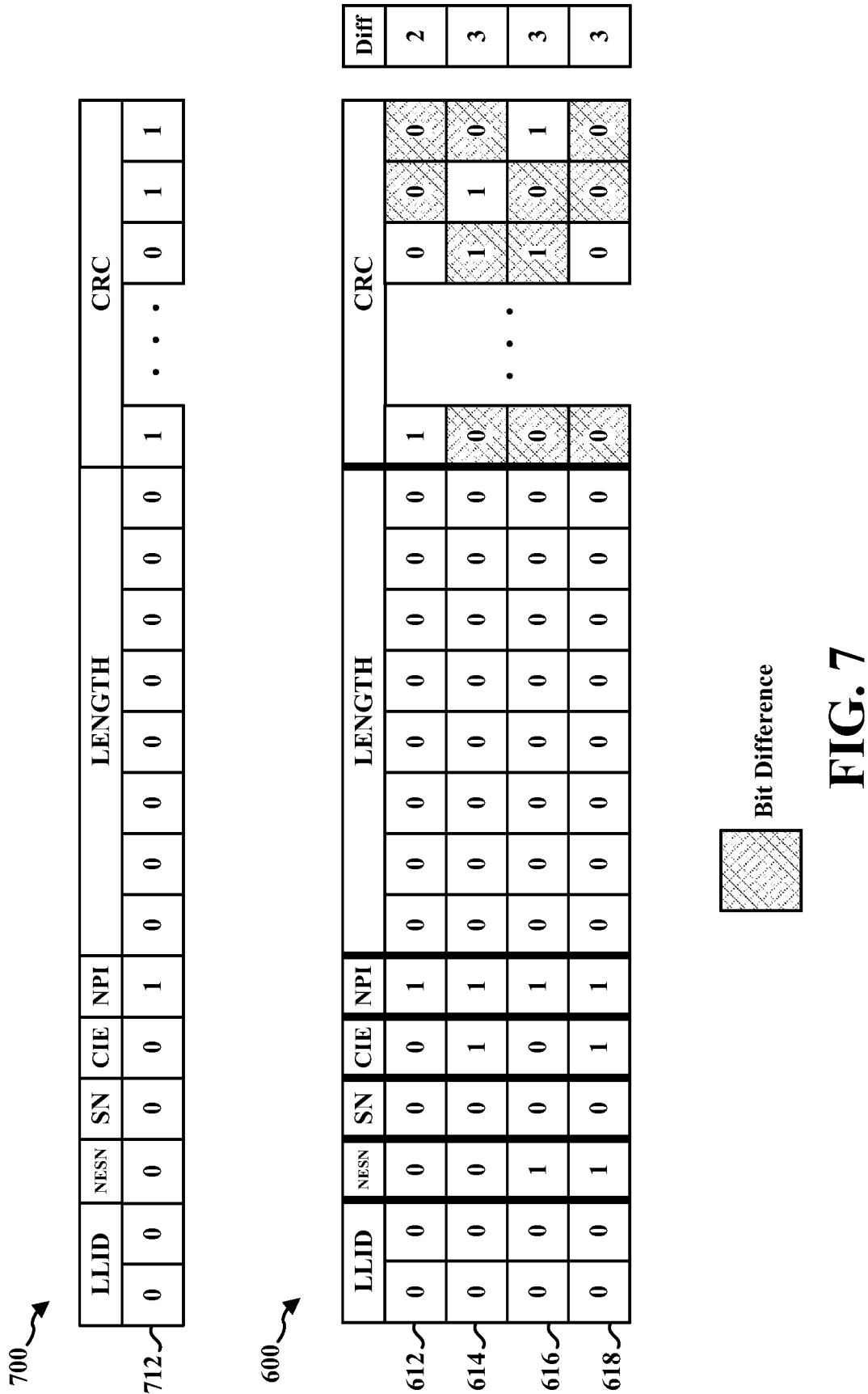
FIG. 7 is a diagram illustrating comparing a received packet to expected packet data CRCs.

In some aspects, the first wireless device 502 compares the CRC of the received isochronous null packet 532 to the expected CRCs of the expected packets to select the replacement from the expected packets. For example, FIG. 7 is a diagram illustrating comparing a received packet 712 to expected packet data 600 CRCs. The first wireless device 502 may compare each bit of the CRC of the received packet 712 to the corresponding bits of the expected CRC values of the expected packets, and may determine a bit difference (e.g., a number of bits which differ) for each expected CRC. As illustrated in FIG. 7, the first wireless device 502 may determine that the expected CRC of the first expected packet 612 has a bit difference of two, that the expected CRC of the second expected packet 614 has a bit difference of three, that the expected CRC of the third expected packet 616 has a bit difference of three, and that the expected CRC of the fourth expected packet 618 has a bit difference of three. The first wireless device 502 may select the expected packet corresponding to a CRC with the lowest bit difference as the replacement packet for isochronous null packet 532. For example, in FIG. 7, the first wireless device 502 may select the first expected packet 612 as the replacement packet for the received packet 712.

Figure 8:
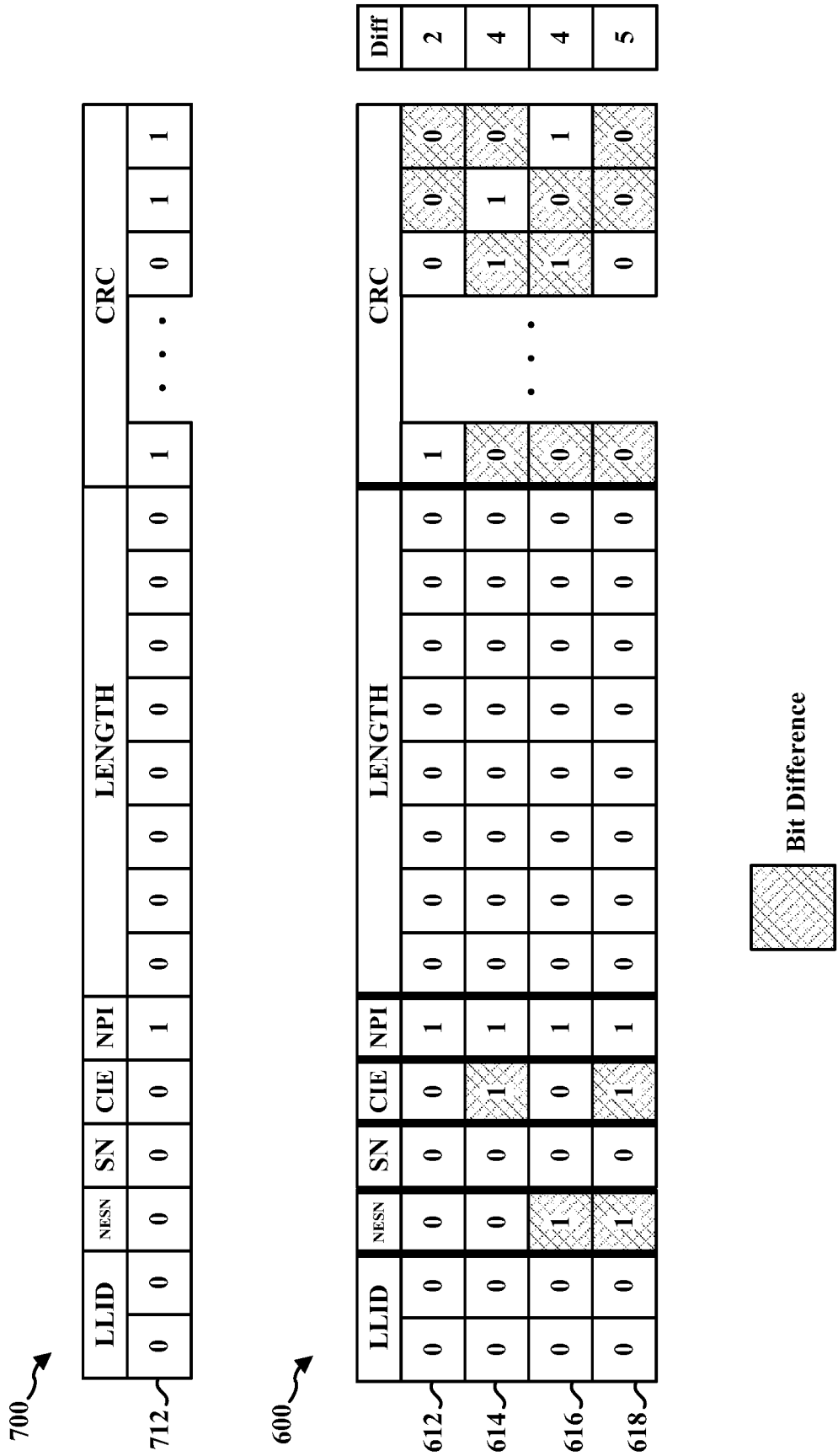
FIG. 8 is a diagram illustrating comparing a received packet to expected packet data headers and CRCs.

In some aspects, the first wireless device 502 compares the PDU header and the CRC of the received isochronous null packet 532 to the headers and expected CRCs of the expected packets to select the replacement from the expected packets. For example, FIG. 8 is a diagram illustrating comparing the received packet 712 to expected packet data 600 headers and CRCs. The first wireless device 502 may compare each bit of the CRC of the header and of the CRC of the received packet 712 to the corresponding bits of the headers and expected CRC values of the expected packets, and may determine a bit difference for each expected packet. As illustrated in FIG. 8, the first wireless device 502 may determine that the header and expected CRC of the first expected packet 612 have a bit difference of two, that the header and expected CRC of the second expected packet 614 have a bit difference of four, that the header and expected CRC of the third expected packet 616 have a bit difference of four, and that the header and expected CRC of the fourth expected packet 618 have a bit difference of five. The first wireless device 502 may select the expected packet having a header and corresponding CRC with the lowest bit difference as the replacement packet for isochronous null packet 532. For example, in FIG. 7, the first wireless device 502 may select the first expected packet 612 as the replacement packet for the received packet 712.

In some aspects, the first wireless device 502 may also compare the bit difference between the received CRC and the expected CRC, or the bit difference between the received header and CRC and the expected header and CRC, to a threshold. Over a certain number of errors, even if the isochronous null packet 532 was transmitted with the values of one of the expected packets, it may be less likely to be correctly identified. Accordingly, if the bit difference is equal to or below the threshold, the first wireless device 502 may utilize the selected expected packet as the replacement packet for the received isochronous null packet 532. If the bit difference is above the threshold, the wireless device 502 may not select the expected packet as the replacement packet for the received isochronous null packet 532, and in some aspects may re-transmit the isochronous data packet 531 to the second wireless device 504.

Although FIGS. 8 and 6 depict headers of BLE packets, the present disclosure is not limited thereto. For example, in some aspects, the packets may be BR/EDR packets, and the CRCs may be the HECs of the BR/EDR packets.

Figure 9:
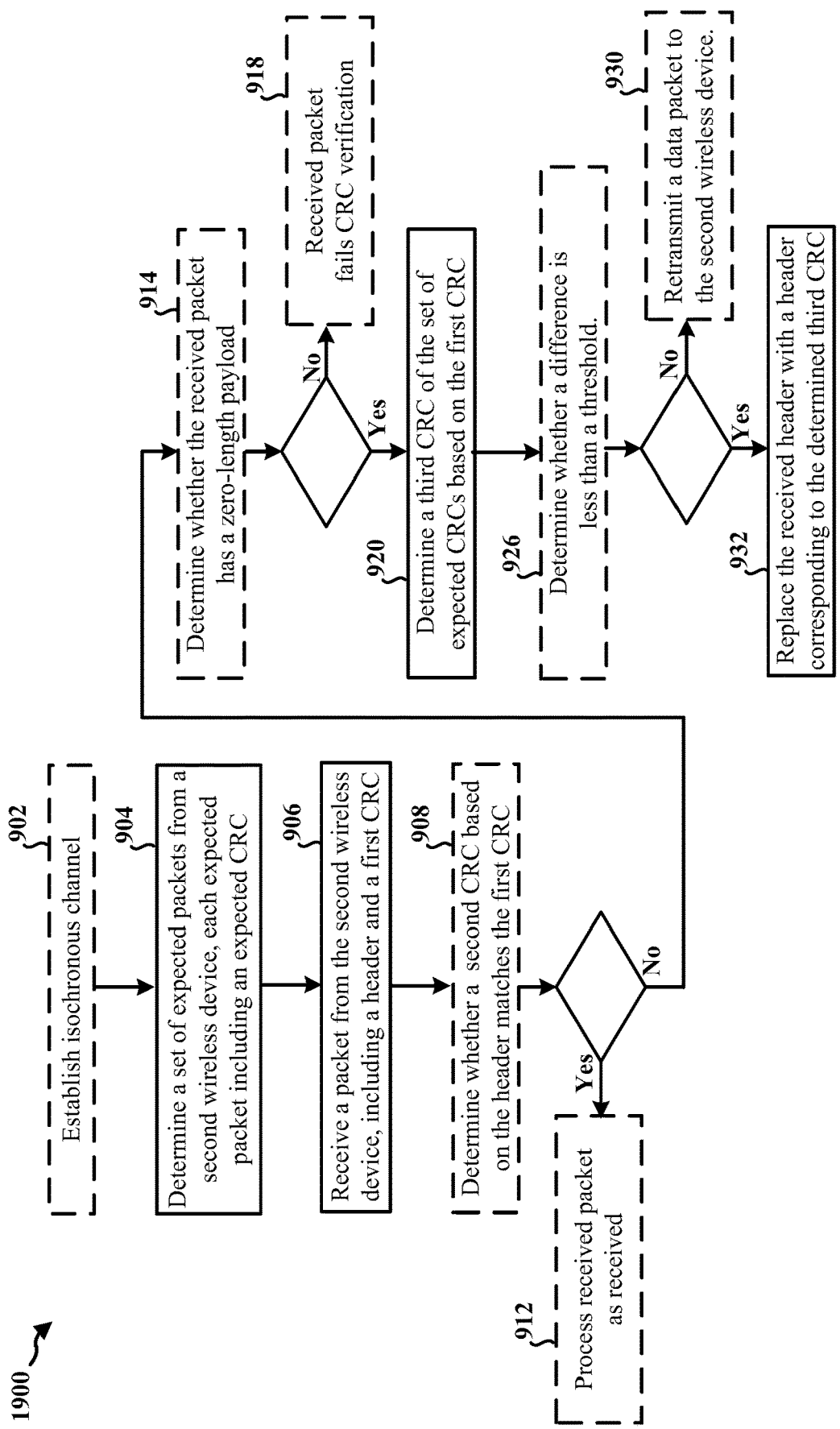
FIG. 9 is a flowchart of a method of wireless communication.

FIG. 9 is a flowchart 900 of a method of wireless communication. The method may be performed by a wireless device (e.g., the wireless device 200 of FIG. 2; the source device 102; the wireless device 502; the processing system 1114, which may include the MMU 240, the memory 206, the flash 210, or the ROM 208 and which may be the entire wireless device or a component of the wireless device, such as the processor 202 and/or the short-range communication controller 252).

In some aspects, at 902, the wireless device may establish an isochronous channel between itself (which may be referred to as a 'first wireless device') and a second wireless device.

At 904, the first wireless device determines a set of expected packets from a second wireless device, each expected packet of the set of expected packets comprising an expected CRC of a set of expected CRCs. For example, the first wireless device may receive null packets with a zero length payload from the second wireless device over the isochronous channel, and may determine the possible values of the null packets and corresponding CRC values.

At 906, the first wireless device receives a packet from the second wireless device, the received packet comprising a header and a first CRC. The received packet may have been received based on a data packet transmitted from the first wireless device to the second wireless device over the isochronous channel.

In some aspects, at 908, the first wireless device may determine whether a second CRC generated based on the header in the received packet matches the first CRC received in the received packet. For example, the first wireless device may generate the second CRC value based on the header in the received packet has the same value as the first CRC received with the header. If the second CRC matches the first CRC, as illustrated at 912, the PDU of the received packet may have been received without errors, and the first wireless device may process the received packet as received. If the second CRC does not match the first CRC, the process may proceed to 914 or 920.

In some aspects, at 914, the first wireless device may determine that the received packet has a zero-length data payload. In some aspects, the first wireless device may determine whether the NPI bit is set to 1 and may determine that the data payload of the PDU of the packet is a zero-length data payload if the NPI bit is set to 1. In some aspects, the first wireless device may actually measure the length of the payload of the PDU to determine whether the payload of the PDU of the packet is a zero-length data payload. If the received packet does not have a zero-length data payload, as illustrated at 918, the received packet may fail CRC verification. If the received packet does have a zero-length data payload, the method may proceed to 920.

At 920, the first wireless device determines, when the generated second CRC does not match the first CRC received in the received packet, a third CRC of the set of expected CRCs based on the first CRC. In some aspects, the first wireless device may determine a number of bit differences between the first CRC and the expected CRCs of the set of expected packets, and may select the expected CRC with the lowest number of bit differences as the third CRC. In some aspects, the first wireless device may determine a number of bit difference between the header of the received packet and the first CRC and the headers and expected CRCs of the set of expected packets, and may select the expected CRC of the expected packet with the lowest number of bit differences as the third CRC.

In some aspects, such as where the packets are BR/EDR packets, the first CRC may be a first header error correction value, the second CRC may be a second header error correction value, and the third CRC may be a third header error correction value In some aspects, at 926, the first wireless device determines whether a difference is less than a threshold. In some aspects, the first wireless device determines whether a difference between the third CRC and the first CRC is less than a threshold. For example, in some aspects, the first wireless device may determine a number of bit differences between the third CRC and the first CRC, and may determine whether the bit differences is less than or equal to the threshold.

In some aspects, the first wireless device determines whether a difference between an expected packet corresponding to the third CRC and the received packet is less than a threshold. For example, in some aspects, the first wireless devices may determine a number of bit differences between components of the expected packet and components of the received packet, including the third CRC and a header of the expected packet and the first CRC and the received header of the received packet, and may determine whether the bit differences is less than or equal to the threshold.

As illustrated at 930, where the received packet is received based on a data packet transmitted from the first wireless device to the second wireless device, the first wireless device may retransmit the data packet to the second wireless device upon determining that the difference (e.g., the difference between the third CRC and the first CRC or the difference between the expected packet corresponding to the third CRC and the received packet) is greater than the threshold.

At 932, the first wireless device replaces the received header with a header corresponding to the determined third CRC. In some aspects, where the packet is received based on a data packet transmitted from the first wireless device to the second wireless device, the first wireless device may determine whether the replaced header corresponds to an acknowledgment (ACK) or negative ACK (NACK) associated with the data packet, and may transmit a next data packet to the second wireless device upon determining that the replaced header corresponds to an ACK.

Figure 10:
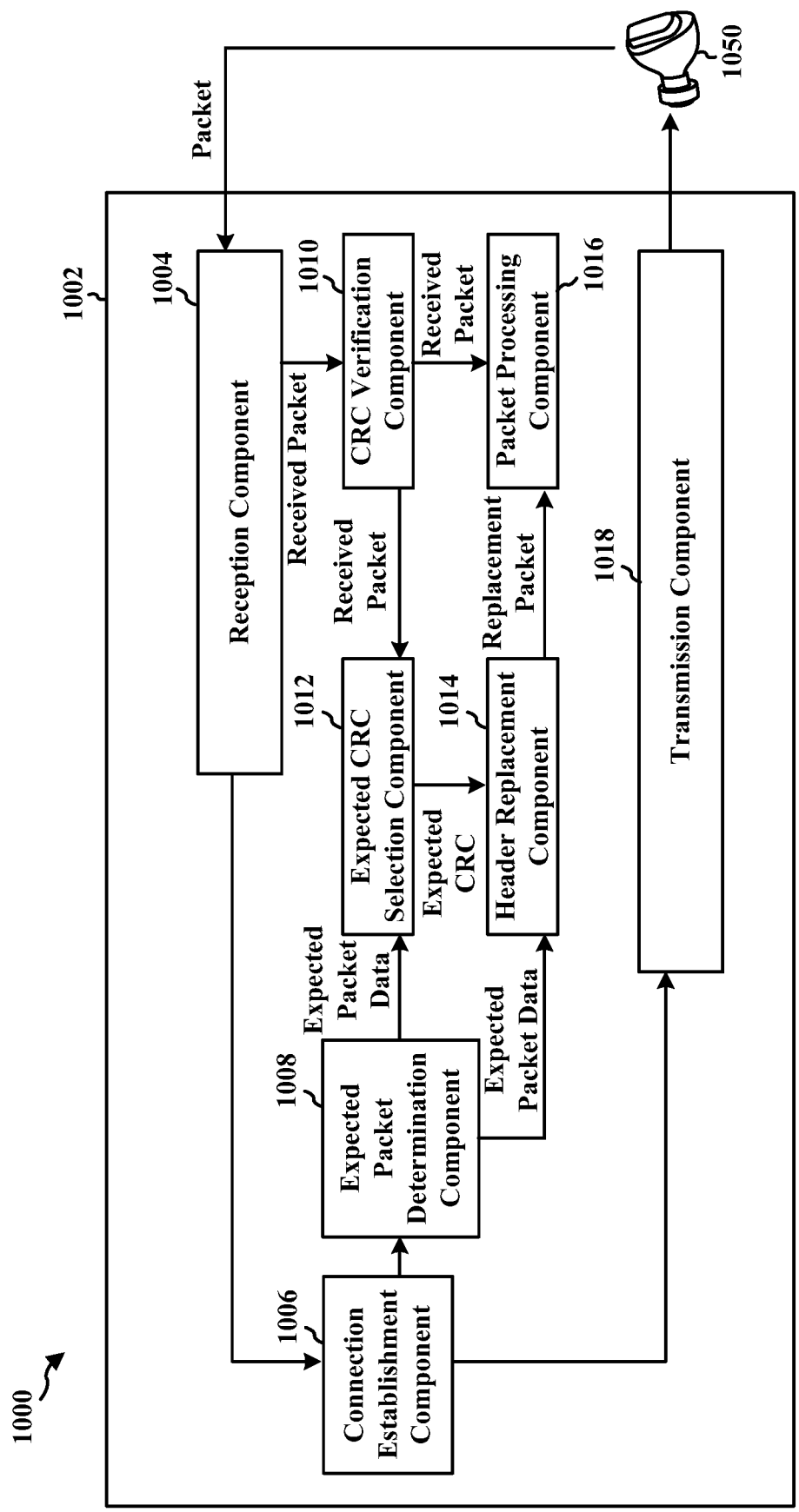
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a wireless device. The apparatus includes a connection establishment component 1006 that establishes a connection such as an isochronous connection with a second wireless device 1050, e.g., as described in connection with 902. The connection establishment component 1006 may utilize a reception component 1004 to receive messages from the second wireless device 1050 and may utilize a transmission component 1018 to transmit messages to the second wireless device 1050 to establish the connection. The apparatus includes an expected packet determination component 1008 that determines a set of expected packets expected to be received from the second wireless device 1050 (such as over the connection established by the connection establishment component 1006), e.g., as described in connection with 904.

The apparatus includes a reception component 1004 that receives a packet from the second wireless device 1050, e.g., as described in connection with 906. The apparatus includes a CRC verification component 1010. The CRC verification component 1010 may receive the received packet, and may determine whether a second CRC generated based on the header of the received packet matches a first CRC received with the packet, e.g., as described in connection with 908. If the CRCs match, the CRC verification component 1010 may forward the received packet to the packet processing component 1016. If the CRCs do not match, the CRC verification component 1010 may forward the received packet to an expected CRC selection component 1012. The apparatus includes the expected CRC selection component 1012. The expected CRC selection component 1012 may receive expected packet data from the expected packet determination component 1008 and may receive the received packet from the CRC verification component 1010. The expected CRC selection component 1012 may select an expected CRC from the expected packet data based on the received packet, e.g., as described in connection with 920. The apparatus includes a header replacement component 1014 that receives expected packet data from the expected packet determination component 1008 and receives the expected CRC from the expected CRC selection component 1012, and that replaces the received header of the received packet with a header corresponding to the determined expected CRC, e.g., as described in connection with 932. The apparatus includes a packet processing component 1016 that processes the received packet from the CRC verification component 1010 or the replacement packet from the header replacement component 1014.

The apparatus may include additional components that perform each of the blocks of the algorithm in the aforementioned flowchart of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
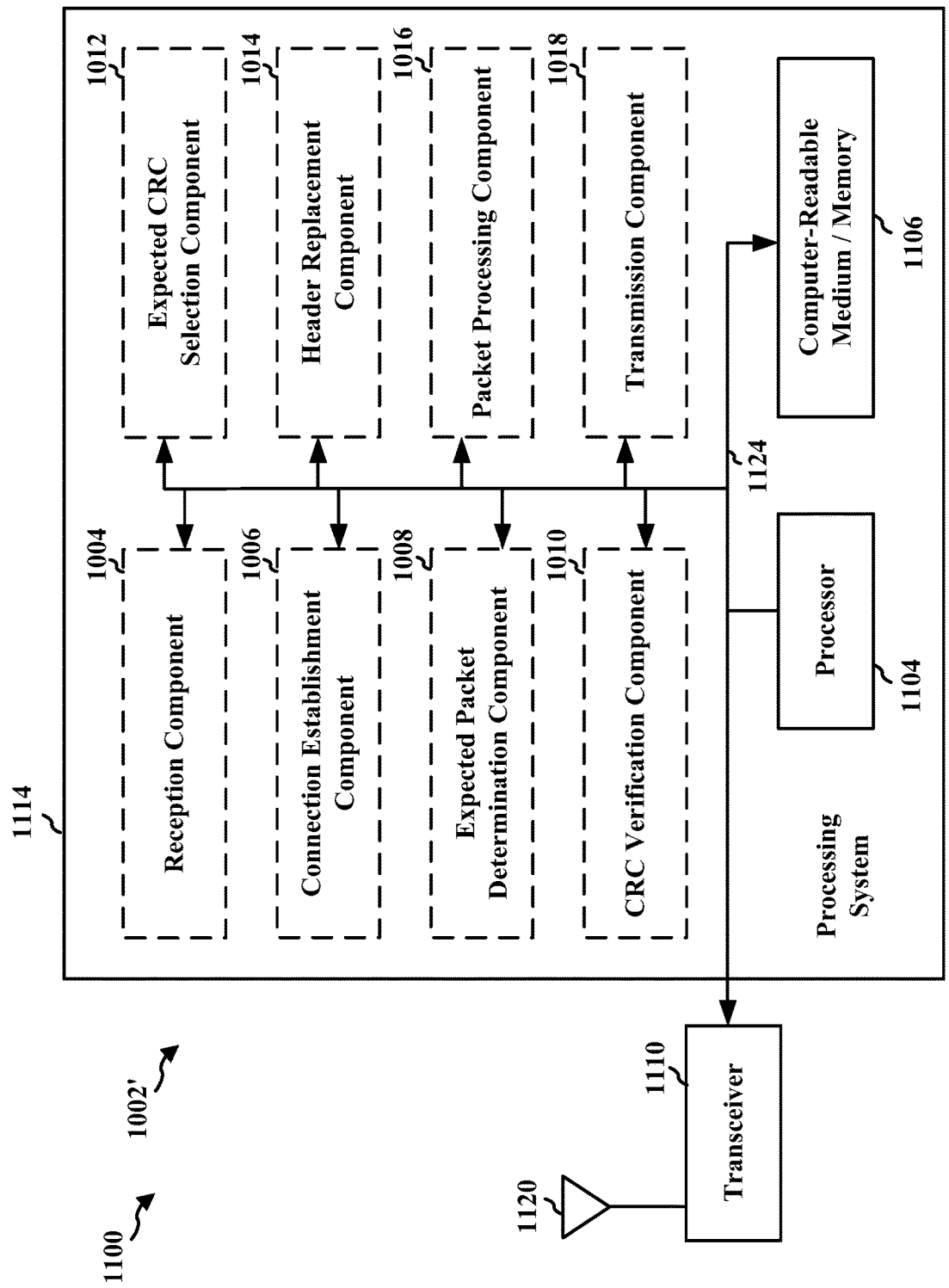
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1018, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018. The components may be software components running in the processor 1104, resident/stored in the computer readable medium/memory 1106, one or more hardware components coupled to the processor 1104, or some combination thereof. The processing system 1114 may be a component of the wireless device 200 and may include the MMU 240, the memory 206, the flash 210, or the ROM 208 and/or at least one of the processor 202 and the short-range communication controller 252. Alternatively, the processing system 1114 may be the entire wireless device (e.g., see 200 of FIG. 2).

In one configuration, the apparatus 1002/1002' for wireless communication includes means for determining a set of expected packets from a second wireless device, each expected packet of the set of expected packets comprising an expected cyclic redundancy check (CRC) of a set of expected CRCs, means for receiving a packet from the second wireless device, the received packet comprising a header and a first CRC, means for determining whether a second CRC generated based on the header in the received packet matches the first CRC received in the received packet, means for determining, when the generated second CRC does not match the first CRC received in the received packet, a third CRC of the set of expected CRCs based on the first CRC, and means for replacing the received header with a header corresponding to the determined third CRC. The aforementioned means may be one or more of the aforementioned components of the apparatus 1002 and/or the processing system 1114 of the apparatus 1002' configured to perform the functions recited by the aforementioned means. As described supra, the processing system 1114 may include the processor 202 and the short-range communication controller 252. As such, in one configuration, the aforementioned means may be the processor 202 and/or the short-range communication controller 252 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first wireless device, comprising:
    determining a set of expected packets from a second wireless device, each expected packet of the set of expected packets comprising an expected cyclic redundancy check (CRC) of a set of expected CRCs;
    receiving a packet from the second wireless device, the received packet comprising a header and a first CRC;
    determining whether a second CRC generated based on the header in the received packet matches the first CRC received in the received packet;
    determining, when the generated second CRC does not match the first CRC received in the received packet, a third CRC of the set of expected CRCs based on the first CRC; and
    replacing the received header with a header corresponding to the determined third CRC.

2. The method of claim 1, further comprising determining whether a difference between the third CRC and the first CRC is less than a threshold, wherein the received header is replaced with the header corresponding to the determined third CRC when the difference between the third CRC and the first CRC is less than the threshold.

3. The method of claim 2, wherein the determining whether the difference between the third CRC and the first CRC is less than the threshold comprises:
    determining a number of bit differences between the third CRC and the first CRC; and
    determining whether the bit differences is less than or equal to the threshold.

4. The method of claim 2, wherein the received packet is received based on a data packet transmitted from the first wireless device to the second wireless device, the method further comprising:
    retransmitting the data packet to the second wireless device upon determining that the difference between the third CRC and the first CRC is greater than the threshold.

5. The method of claim 1, further comprising determining whether a difference between an expected packet corresponding to the third CRC and the received packet is less than a threshold, wherein the received header is replaced with the header corresponding to the determined third CRC when the difference between the expected packet and the first CRC is less than the threshold.

6. The method of claim 5, wherein the determining whether the difference between the expected packet and the received packet is less than the threshold comprises:
    determining a number of bit differences between components of the expected packet and components of the received packet, the components of the expected packet comprising the third CRC and a header of the expected packet, the components of the received packet comprising the first CRC and the received header of the received packet; and
    determining whether the bit differences is less than or equal to the threshold.

7. The method of claim 1, further comprising determining that the received packet has a zero-length data payload, wherein the third CRC of the set of expected CRCs is determined based on the first CRC when the received packet is determined to have a zero-length data payload.

8. The method of claim 1, further comprising establishing an isochronous channel between the first wireless device and the second wireless device, wherein the third CRC of the set of expected CRCs is determined based on the first CRC when the isochronous channel is established.

9. The method of claim 1, wherein the packet is received based on a data packet transmitted from the first wireless device to the second wireless device, the method further comprising:
    determining whether the replaced header corresponds to an acknowledgment (ACK) or negative ACK (NACK) associated with the data packet; and
    transmitting a next data packet to the second wireless device upon determining that the replaced header corresponds to an ACK.

10. The method of claim 1, wherein the first CRC is a first header error correction value, the second CRC is a second header error correction value, and the third CRC is a third header error correction value.

11. An apparatus for wireless communication at a first wireless device, comprising:
    means for determining a set of expected packets from a second wireless device, each expected packet of the set of expected packets comprising an expected cyclic redundancy check (CRC) of a set of expected CRCs;
    means for receiving a packet from the second wireless device, the received packet comprising a header and a first CRC;

means for determining whether a second CRC generated based on the header in the received packet matches the first CRC received in the received packet;

means for determining, when the generated second CRC does not match the first CRC received in the received packet, a third CRC of the set of expected CRCs based on the first CRC; and means for replacing the received header with a header corresponding to the determined third CRC.

12. The apparatus of claim 11, further comprising means for determining whether a difference between the third CRC and the first CRC is less than a threshold, wherein the received header is replaced with the header corresponding to the determined third CRC when the difference between the third CRC and the first CRC is less than the threshold.

13. The apparatus of claim 12, wherein the means for determining whether the difference between the third CRC and the first CRC is less than the threshold is configured to:

determine a number of bit differences between the third CRC and the first CRC; and determine whether the bit differences is less than or equal to the threshold.

14. The apparatus of claim 12, wherein the received packet is received based on a data packet transmitted from the first wireless device to the second wireless device, the apparatus further comprising:

means for retransmitting the data packet to the second wireless device upon determining that the difference between the third CRC and the first CRC is greater than the threshold.

15. The apparatus of claim 11, further comprising means for determining whether a difference between an expected packet corresponding to the third CRC and the received packet is less than a threshold, wherein the received header is replaced with the header corresponding to the determined third CRC when the difference between the expected packet and the first CRC is less than the threshold.

16. The apparatus of claim 15, wherein the means for determining whether the difference between the expected packet and the received packet is less than the threshold is configured to:

determine a number of bit differences between components of the expected packet and components of the received packet, the components of the expected packet comprising the third CRC and a header of the expected packet, the components of the received packet comprising the first CRC and the received header of the received packet; and determine whether the bit differences is less than or equal to the threshold.

17. The apparatus of claim 11, further comprising means for determining that the received packet has a zero-length data payload, wherein the third CRC of the set of expected CRCs is determined based on the first CRC when the received packet is determined to have a zero-length data payload.

18. The apparatus of claim 11, further comprising means for establishing an isochronous channel between the first wireless device and the second wireless device, wherein the third CRC of the set of expected CRCs is determined based on the first CRC when the isochronous channel is established.

19. The apparatus of claim 11, wherein the packet is received based on a data packet transmitted from the first wireless device to the second wireless device, the apparatus further comprising:

means for determining whether the replaced header corresponds to an acknowledgment (ACK) or negative ACK (NACK) associated with the data packet; and means for transmitting a next data packet to the second wireless device upon determining that the replaced header corresponds to an ACK.

20. The apparatus of claim 11, wherein the first CRC is a first header error correction value, the second CRC is a second header error correction value, and the third CRC is a third header error correction value.

21. An apparatus for wireless communication at a first wireless device, comprising:

a memory; and at least one processor coupled to the memory and configured to:

determine a set of expected packets from a second wireless device, each expected packet of the set of expected packets comprising an expected cyclic redundancy check (CRC) of a set of expected CRCs;

receive a packet from the second wireless device, the received packet comprising a header and a first CRC;

determine whether a second CRC generated based on the header in the received packet matches the first CRC received in the received packet;

determine, when the generated second CRC does not match the first CRC received in the received packet, a third CRC of the set of expected CRCs based on the first CRC; and replace the received header with a header corresponding to the determined third CRC.

22. The apparatus of claim 21, wherein the processor is further configured to determine whether a difference between the third CRC and the first CRC is less than a threshold, wherein the received header is replaced with the header corresponding to the determined third CRC when the difference between the third CRC and the first CRC is less than the threshold.

23. The apparatus of claim 22, wherein the determining whether the difference between the third CRC and the first CRC is less than the threshold comprises:

determining a number of bit differences between the third CRC and the first CRC; and determining whether the bit differences is less than or equal to the threshold.

24. The apparatus of claim 22, wherein the received packet is received based on a data packet transmitted from the first wireless device to the second wireless device, and wherein the processor is further configured to retransmit the data packet to the second wireless device upon determining that the difference between the third CRC and the first CRC is greater than the threshold.

25. The apparatus of claim 21, wherein the processor is further configured to determine whether a difference between an expected packet corresponding to the third CRC and the received packet is less than a threshold, wherein the received header is replaced with the header corresponding to the determined third CRC when the difference between the expected packet and the first CRC is less than the threshold.

26. The apparatus of claim 25, wherein the determining whether the difference between the expected packet and the received packet is less than the threshold comprises:

determining a number of bit differences between components of the expected packet and components of the received packet, the components of the expected packet comprising the third CRC and a header of the expected packet, the components of the received packet comprising the first CRC and the received header of the received packet; and determining whether the bit differences is less than or equal to the threshold.

27. The apparatus of claim 21, wherein the processor is further configured to determine that the received packet has a zero-length data payload, wherein the third CRC of the set of expected CRCs is determined based on the first CRC when the received packet is determined to have a zero-length data payload.

28. The apparatus of claim 21, wherein the processor is further configured to establish an isochronous channel between the first wireless device and the second wireless device, wherein the third CRC of the set of expected CRCs is determined based on the first CRC when the isochronous channel is established.

29. The apparatus of claim 21, wherein the packet is received based on a data packet transmitted from the first wireless device to the second wireless device, and wherein the processor is further configured to:

determine whether the replaced header corresponds to an acknowledgment (ACK) or negative ACK (NACK) associated with the data packet; and transmit a next data packet to the second wireless device upon determining that the replaced header corresponds to an ACK.

30. The apparatus of claim 21, wherein the first CRC is a first header error correction value, the second CRC is a second header error correction value, and the third CRC is a third header error correction value.

31. A non-transitory computer-readable medium storing computer executable code for wireless communication at a user equipment, wherein the code when executed by a processor causes the processor to perform the method of any of claims 1-10.

* * * * *